J. H. GOEHST & R. G. CARPENTER.
POWER TABLE FOR KITCHEN UTENSILS.
APPLICATION FILED APR. 22, 1910.
1,014,217.
Patented Jan. 9, 1912.
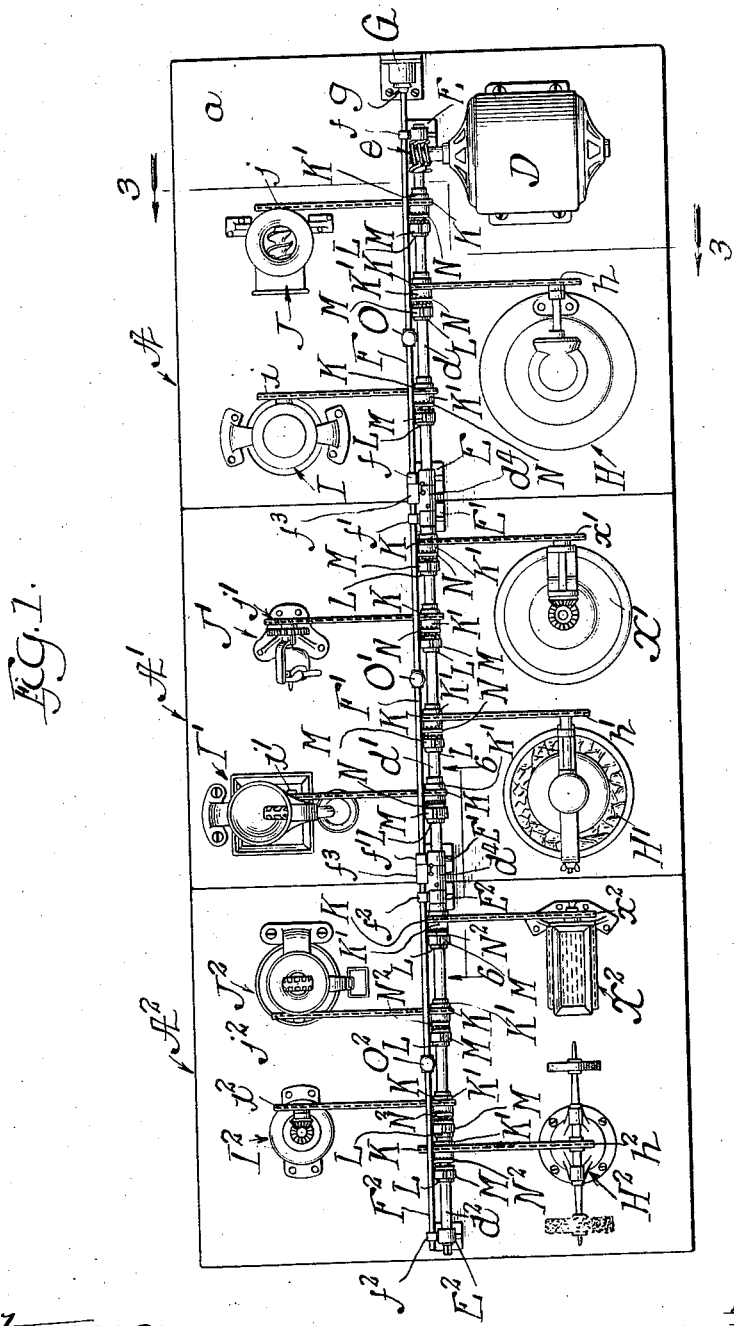

J. H. GOEHST & R. G. CARPENTER.
POWER TABLE FOR KITCHEN UTENSILS.
APPLICATION FILED APR. 22, 1910.
1,014,217.
Patented Jan. 9, 1912.
3 SHEETS—SHEET 2.
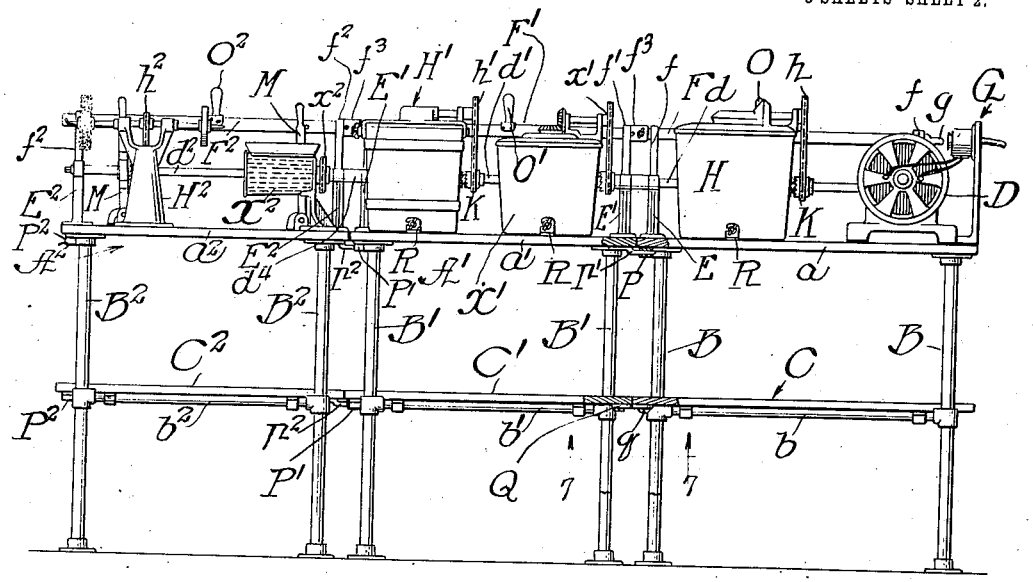
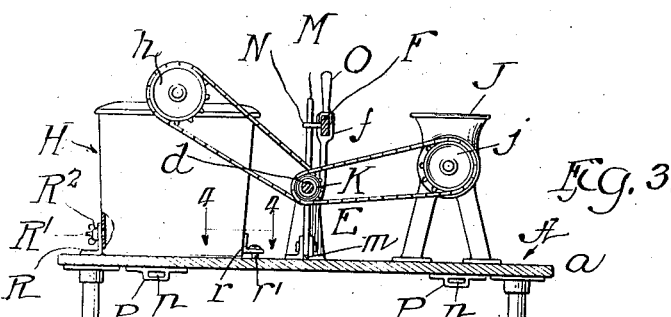
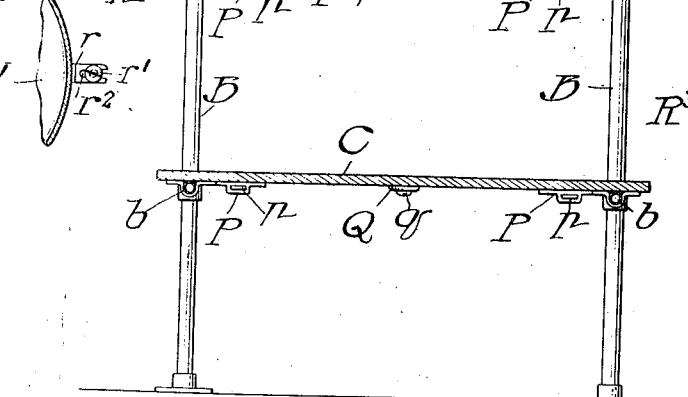
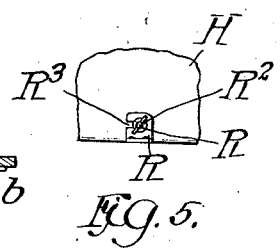
Witnesses:
Inventors:
John H. Goehst
Ralph G. Carpenter
by Poole & Brown
Attys J. H. GOEHST & R. G. CARPENTER.
POWER TABLE FOR KITCHEN UTENSILS.
APPLICATION FILED APR. 22, 1910.
1,014,217.
Patented Jan. 9, 1912.
3 SHEETS—SHEET 3.
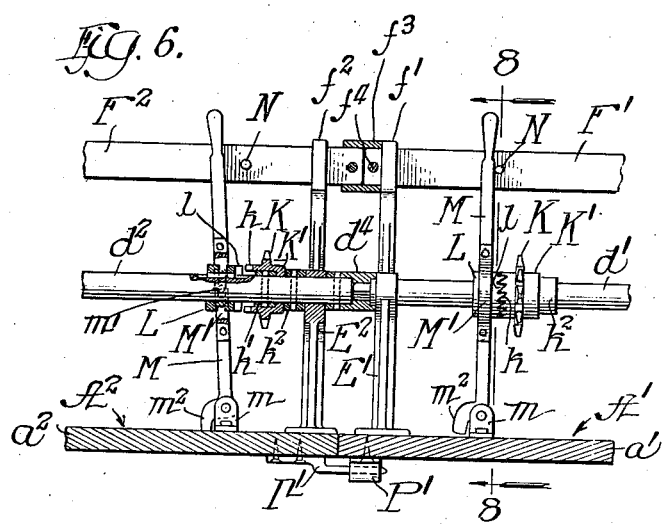
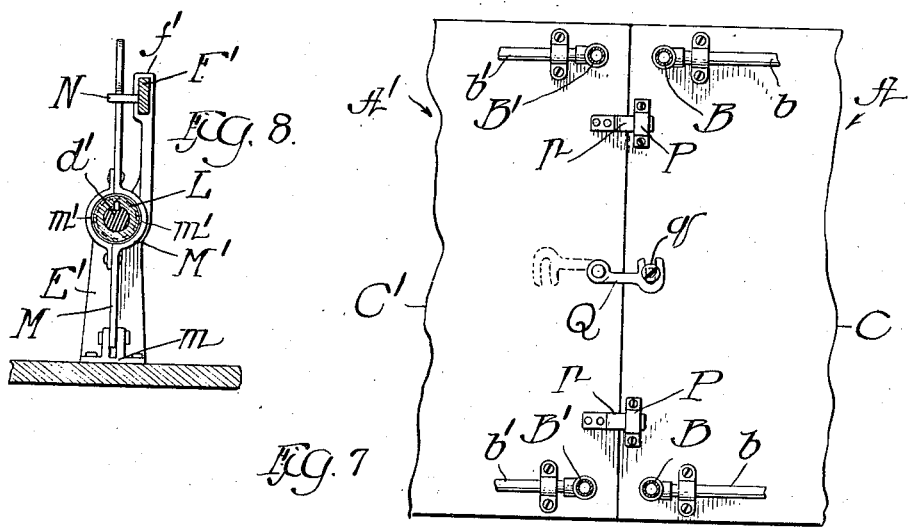
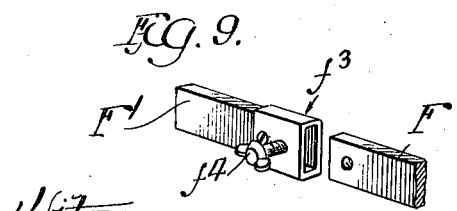
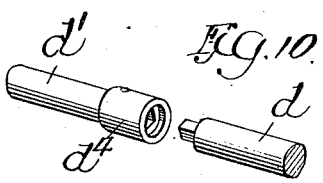
Witnesses:
Inventors
John H. Goehst
Ralph G. Carpenter
by Poole & Brown Attys

UNITED STATES PATENT OFFICE.

JOHN H. GOEHST AND RALPH G. CARPENTER, OF CHICAGO, ILLINOIS, ASSIGNORS TO THE FEDERAL ELECTRIC COMPANY, OF CHICAGO, ILLINOIS, A CORPORATION OF ILLINOIS.

POWER-TABLE FOR KITCHEN UTENSILS.

1,014,217.   Specification of Letters Patent.   Patented Jan. 9, 1912.

Application filed April 22, 1910. Serial No. 557,081.

*To all whom it may concern:*

Be it known that we, JOHN H. GOEHST and RALPH G. CARPENTER, citizens of the United States, and residents of Chicago, in the county of Cook and State of Illinois, have invented certain new and useful Improvements in Power-Tables for Kitchen Utensils; and we do hereby declare that the following is a full, clear, and exact description thereof, reference being had to the accompanying drawings, and to the letters of reference marked thereon, which form a part of this specification.

This invention relates to a power table for kitchen utensils, such as dough-mixers, cherry-seeders, food-grinders and the like, which are now usually operated by hand-rotated cranks.

The invention consists of the matters hereinafter described and more particularly pointed out in the appended claims.

As shown in the drawings:—Figure 1 is a top plan view of the power table. Fig. 2 is a front elevation of the same on a slightly smaller scale. Fig. 3 is a vertical section through Fig. 1 on the line 3—3 thereof. Fig. 4 is a partial section through Fig. 3 on the line 4—4 thereof, illustrating one of the oppositely disposed members of the locking mechanism, by means of which the utensils are secured to the table. Fig. 5 is a vertical elevation of the other locking member. Fig. 6 is a partial vertical section on an enlarged scale on the line 6—6 of Fig. 1. Fig. 7 is a partial section on an enlarged scale of Fig. 2 on the line 7—7 thereof. Fig. 8 is a transverse section through Fig. 6 on the line 8—8 thereof. Figs. 9 and 10 are detail perspective views on enlarged scales, showing the means for connecting the several units comprising the operating bar and the power shaft, respectively.

In that embodiment of our invention illustrated in the drawings, the power table consists of a plurality of sections or units, as shown, three in number, each section or unit consisting of a separate table which is complete in itself except for the motor, and which is provided with several different utensils, with a driving shaft, and means for operatively connecting the driving shaft to the said utensils. To one of said units is attached a motor which is geared to the driving shaft carried by said unit. The several units are constructed so that they may be readily connected together to make a rigid table of the length of all of said units together.

A, A¹, A² indicate the several unit sections of the table, A being the power section. The several unit sections of the table comprise each a top and supporting legs and preferably an under shelf to hold utensils when they are not in use.

Looking now particularly at the power table, A, it comprises a top $a$, and vertical supporting legs B, preferably made of metal tubes and braced longitudinally by means of tubular bars $b$ which also serve as a support for the shelf C. The shelf C and the top $a$ are of equal length and project longitudinally beyond the legs B so that their end margins terminate in the same vertical plane.

D indicates an electric motor and $d$, a power shaft arranged horizontally above the table top $a$ and supported in suitable standards E, E located at each end of the table unit. The shaft $d$ is rotated by means of a worm gearing $e$.

F indicates a switch operating bar which is slidably mounted in eyes $f$ formed upon the upper end of the standard E.

G is a switch of the socket type by means of which the motor D may be thrown into circuit with a suitable source of electric supply (not shown) and $g$ is a switch plug carried at the end of the bar F and adapted to engage in said switch socket.

To the top of the table are detachably secured several utensils, for example, a bread-mixer H, a coffee-mill I, and a meat-grinder or cutter J, each of said utensils being operated by means of sprocket wheels $h$, $i$, $j$, respectively. Each of these utensils are adapted to be driven by a sprocket chain from a sprocket wheel mounted on the power shaft $d$, and as the construction and arrangement in each instance is the same, it will be sufficient to describe one of them.

As best seen in Figs. 1, 6 and 8, K indicates a driving sprocket wheel mounted on the power shaft $d$. Said sprocket wheel is provided with a flanged hub K¹ having clutch teeth $k$ at the margins of said flange, and an annular recess about the shaft $d$ to receive a ring $k^1$. Said ring is rigidly connected to the power shaft and it, together with a ring $k^2$ which abuts against the end of a hub K¹, and which is also pinned to the shaft, retains said sprocket wheel in position opposite the particular sprocket wheel of the utensil which it is to drive, while, at the same time, permitting said driving wheel to turn loosely on said power shaft.

L indicates a clutch member feathered to the shaft $d$ adjacent to the sprocket wheel K, and provided with clutch teeth $l$ adapted to be brought into engagement with the clutch teeth $k$ on the hub $K^1$. Said clutch is operated by means of a vertically swinging lever M which is hinged by means of a suitable lug $m$ to the top of the table, and which is provided near its middle with a loop $M^1$ embracing said clutch member and having inwardly projecting pins $m^1$ which engage in an annular groove $L^1$ formed in the outer surface of the clutch L. It will be seen from this description that the clutch member rotates continuously with the power shaft and that the driving sprocket wheel K may be rigidly connected with the power shaft by means of said clutch member which is thrown into clutch engagement therewith, by the lever M. The lower end of the lever M is provided with a heel $m^2$ to limit the throw of the lever away from the sprocket wheel. A lever, its clutch member, and a driving sprocket wheel are provided opposite each utensil with the driving sprocket wheel in line with the sprocket wheel which operates such utensil.

In Fig. 6 the lever M on the right hand of the figure is shown in that position in which its clutch member is in engagement with the adjacent sprocket wheel, while the lever at the left is shown in the position in which it is disengaged. Adjacent each lever there is secured to the bar F a pin N. When the bar F is in its retracted position and the various clutch members are disengaged, each of said pins are in engagement with their respective levers, so that the shifting of any lever will not only bring its clutch member into engagement to rigidly connect the corresponding sprocket wheel with the power shaft, but the operation of said lever will also shift the rod F to bring the plug $g$ at the end of said rod into engagement with the socket switch G, thereby starting the motor. When several of the utensils are in operation at the same time their particular clutches may be thrown out individually, or if desired, all the clutches may be thrown out at once and the motor stopped by shifting the bar F to the left, which may be done by means of a handle or grip O secured to said bar.

The units $A^1$, $A^2$ are all constructed and arranged like the unit just described, like letters of reference indicating like parts, with the superscript number changed to correspond to that of the particular unit in which it is found.

We will now pass to the particular description of the means by which the several units are attached together. The left end of the power shaft and of the bar F are provided with rectangular ends which terminate in the same plane as the end of the top $a$ and the shelf C.

$f^3$, $d^4$ indicate couplings which are preferably permanently secured, respectively, to the bar $F^1$ and power shaft $d^1$ of the adjacent unit section, so that when the two unit sections are moved together the ends of the bar F and the shaft $d$ will slip into said couplings and the bar sections F, $F^1$, and the shaft sections $d$, $d^1$ thus make rigid connection when the unit sections of the table are secured together. A fly-bolt $f^4$ connects the coupling $f^3$ to the bar F, so that the longitudinal movement of one bar will be communicated to the other.

Any suitable means may be used for locking the sections of the table together. As illustrated herein, the left end of the unit A is provided with socket members P secured to the undersides of the top $a$, and of the shelf C, while the adjacent section is provided with similarly located tongues $p$ which are adapted to engage within said sockets. For holding the table units in longitudinal relation, we provide an ordinary swinging hook Q pivotally connected to the underside of the right hand end of the shelf $C^1$, and a headed screw $q$ similarly located near the adjacent end of the shelf C and adapted to be engaged by the hook.

The advantages of the unit construction are readily apparent from the description. The housewife may buy the power section of the table first, which is provided with the more generally used untensils; later, as she can afford it, she may acquire other unit sections containing other utensils which may be connected to the first unit with little or no trouble and in a short space of time. When connected together, the several units form a rigid table and the sections of the power shaft and of the operating bar constitute continuous members, and act as if formed integrally.

The several utensils are detachably secured to the table top $a$ as follows:—At one side, preferably the side toward the power shaft, of the utensil, near the bottom, is secured an angular clip $r$ (see Fig. 4) with its vertical leg against the body of the utensil and its horizontal leg provided with a notch $r^2$ at its end which is adapted to engage the shank of a bolt $r^1$, the head of the bolt engaging against the upper surface of said horizontal leg of the clip. Diametrically opposite said clip $r$ a second angular clip R is secured to the table top with its vertical leg provided on one lateral margin with a notch $R^3$ which engages a bolt $R^1$ secured to and projecting from the body of said utensil. A fly-nut $R^2$ serves to clamp the parts in position. When it is desired to detach the utensil from the table, the fly-nut R² is loosened, and the body of the utensil swung about to release the bolt R¹ from its engagement with the notch R³, whereupon the clip r may be withdrawn from the bolt r¹ and the utensil removed from the table top.

It will be apparent that by removing the several utensils from the top of the table and placing them on the shelf C, the power table may be used as an ordinary kitchen table, or, by removing one or more of said utensils, part of the table may be used as a kitchen table while the rest is being used as a power table. This is of great value in economizing floor space, which is of the highest importance in the modern kitchen where floor space is diminishing rather than increasing.

We claim as our invention:—

1. A power table for kitchen utensils embracing a table, a power shaft supported on said table, an electric motor adapted to rotate said shaft, a driving member loosely mounted on said shaft and having fixed longitudinal relation thereon to a driven member, a clutch member feathered to said shaft adjacent said driving member, means for moving said clutch member into and out of operative engagement with said driving member, and a switch adapted to throw said motor in circuit with a source of current supply, said switch including a movable member adapted to be operated by said clutch operating means when the clutch is thrown into engagement with said driving member.

2. A power table for kitchen utensils embracing a table, a power shaft supported on said table, an electric motor adapted to rotate said shaft, a driving member loosely mounted on said shaft and having fixed longitudinal relation thereon to a driven member, a clutch member feathered to said shaft adjacent said driving member, a vertically swinging lever hinged to said table and operatively connected with said clutch member, a socket switch adapted to throw said motor in circuit with a source of current supply, a reciprocable member or bar supported above said table, a switch plug carried by said reciprocable bar, and a pin carried by said bar adapted to be engaged by said vertically swinging lever when said lever is swung to throw said clutch member into engagement with said driving member.

3. A power table for kitchen utensils embracing a table, a power shaft supported above said table, an electric motor adapted to rotate said shaft, a plurality of kitchen utensils secured to said table, each provided with a driven member adapted to operate said utensil, driving members loosely mounted on said shaft, each having fixed longitudinal relation thereon with respect to the driven member of one of said utensils, a clutch member feathered to said shaft adjacent each of said driving members, vertically swinging levers hinged to said table constructed to operate said clutch members, a socket switch supported above said table adapted to throw said motor into circuit with a source of current supply, a reciprocating bar supported above said table, a switch plug carried by said bar, and pins located on said bar, one for each vertically swinging lever, adapted to be engaged by said levers when they are thrown to bring said clutch members into engagement with their respective driving members.

4. A power table for kitchen utensils comprising a series of table sections and a power shaft section, a sectional switch operating member, and one or more kitchen utensils carried by each table section, means for detachably connecting said table, power shaft and switch operating member sections, a motor secured to one of said table sections adapted to rotate the power shaft section carried by said table section, a switch carried by said table section, and mechanism carried by said table sections adapted to operatively connect to said power shaft any one of the utensils carried by said table sections.

5. A power table for kitchen utensils comprising a series of table sections and a power shaft section, a sectional switch operating member, and one or more kitchen utensils carried by each table section, means for detachably connecting said table, power shaft and switch operating member sections, a motor secured to one of said table sections adapted to rotate the power shaft section carried by said table section, a switch carried by said table section, mechanism carried by said table sections adapted to operatively connect to said power shaft any one of the utensils carried by said table sections, and means adapted to automatically throw said switch operating member when any one of said utensils is operatively connected to its respective power shaft section.

6. A power table for kitchen utensils comprising a series of table sections and a power shaft section, a sectional switch operating member, and one or more kitchen utensils carried by each table section, means for detachably connecting said table, power shaft and switch operating member sections, an electric motor secured to one of said table sections adapted to operate the power shaft carried by said table section, a socket switch carried by said table section, a switch plug secured to the sectional switch operating bar of said table section, driving members, one for each utensil, loosely mounted on said power shaft sections in fixed longitudinal relation thereon to the utensil driven by it, clutch members feathered to said power shaft sections adjacent said driving members, levers hinged to said table sections and operatively connected to said clutch members, and means intermediate said levers and said sectional switch bars whereby the movement of any lever to operatively connect its clutch member to a driving member will throw said switch bar to operatively connect said switch plug and switch.

In testimony that we claim the foregoing as our invention we affix our signatures in the presence of two witnesses, this 16th day of April A. D. 1910.

JOHN H. GOEHST.
RALPH G. CARPENTER.

Witnesses:
T. H. ALFREDS,
GEORGE R. WILKINS.